United States Patent [19]

Bronnec et al.

[11] Patent Number: 5,259,958
[45] Date of Patent: Nov. 9, 1993

[54] HYDROCARBON EXTRACTOR

[75] Inventors: Jean Bronnec, Brest; Bertrand Gaudebert, Orthez; Jean C. LeRoux, Plouven; Jean-François Vidalie, Bures S/Yvette; Jean-Pierre Thery, Le Chesnay; Thierry des Vallières, Boulogne, all of France

[73] Assignee: Societe Nationale Elf Aquitaine (Production), France

[21] Appl. No.: 56,573

[22] Filed: Apr. 30, 1993

Related U.S. Application Data

[63] Continuation of Ser. No. 750,321, Aug. 27, 1991, abandoned.

Foreign Application Priority Data

Aug. 31, 1990 [FR] France .................. 90 10909

[51] Int. Cl.⁵ ............... B01D 43/00; B01D 15/02; B01D 33/04
[52] U.S. Cl. ............... 310/526; 210/242.3; 210/242.4; 210/400; 196/14.52; 585/920
[58] Field of Search .......... 210/242.3, 242.4, 400, 210/526, 923, 924; 196/14.52; 585/920

[56] References Cited

U.S. PATENT DOCUMENTS

| | | | |
|---|---|---|---|
| 3,617,555 | 11/1971 | Ginsburgh et al. | 210/30 |
| 3,695,451 | 10/1972 | Schmidt, Jr. et al. | 210/400 |
| 4,485,013 | 11/1984 | Cockman | 210/242.3 |
| 4,557,832 | 12/1985 | Verboom | 210/242.3 |
| 4,652,372 | 3/1987 | Threadgill | 210/242.3 |

FOREIGN PATENT DOCUMENTS

2703210A1 8/1978 Fed. Rep. of Germany .
2114382 6/1972 France .

Primary Examiner—Anthony McFarlane
Assistant Examiner—Nhat D. Phan
Attorney, Agent, or Firm—Bacon & Thomas

[57] ABSTRACT

A hydrocarbon extractor, intended to be disposed above a tank (10) containing a mixture of a liquid and a liquid hydrocarbon, comprises a belt (16) made of an oleophilic material which is adapted to be immersed in the mixture and two oleophilic rollers (26, 28), disposed one on each side of the belt, for recovering the liquid hydrocarbon from the belt. The rollers are rotated in an opposite direction to that of the movement of the belt and at a higher speed than the belt to enhance the recovery process.

3 Claims, 1 Drawing Sheet

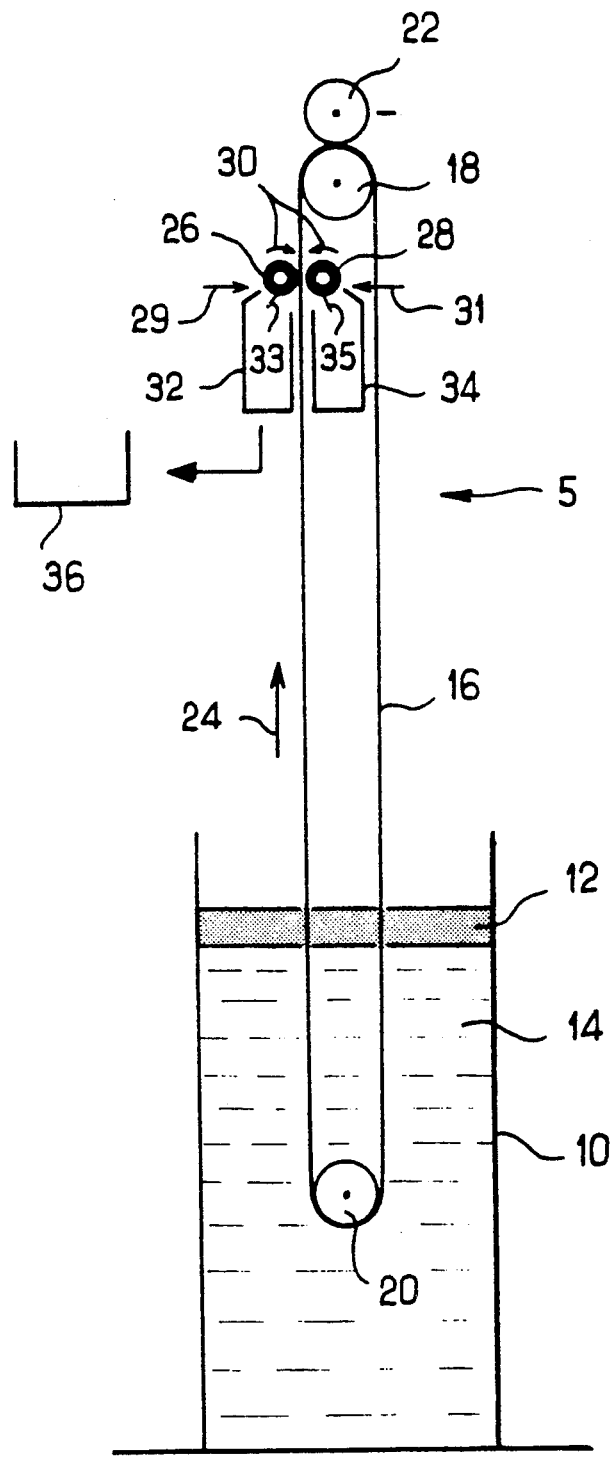

HYDROCARBON EXTRACTOR

This application is a continuation of application Ser. No. 07/750,321, filed Aug. 27, 1991, now abandoned.

BACKGROUND OF THE INVENTION

The present invention relates to a hydrocarbon extractor, and more particularly to an extractor of this kind which is intended to recover a liquid hydrocarbon from a mixture of water and hydrocarbon.

In numerous situations, for example in the case of vertical vessels such as the caisson sumps of a petroleum platform, the problem arises of water contaminated by the presence of a liquid hydrocarbon. In order to avoid any pollution of the sea it is necessary to separate the liquid hydrocarbon from the water before the latter is returned to the sea.

It has already been proposed to make use of a hydrocarbon extractor to recover the liquid hydrocarbon from the water. As a rule an extractor of this kind comprises an oleophilic belt driven to move through the mixture of hydrocarbon and water, together with means, such as scrapers, intended to remove the hydrocarbon from the belt.

The amount of hydrocarbon removed from the belt by, scrapers is necessarily limited. In addition, the prolonged use of the scrapers may lead to mechanical deterioration of the oleophilic belt.

SUMMARY OF THE INVENTION

The subject of the present invention is a hydrocarbon extractor which effects optimum recovery of hydrocarbons from the oleophilic belt and which is of simple construction and of increased reliability.

For this purpose the invention provides a hydrocarbon extractor intended to be disposed above a tank 10 containing a mixture of a liquid and of a liquid hydrocarbon, a belt 16 made of oleophilic material and adapted to be immersed in said mixture, and means 26, 28 for recovering the liquid hydrocarbon from the belt 16, said extractor being characterized in that the means 26, 28 comprise two olephilic rollers 26, 28 disposed one on each side of the belt.

Other characteristics and advantages of the present invention will emerge more clearly on perusal of the description given below with reference to the accompanying drawing.

BRIEF DESCRIPTION OF THE DRAWING

The single FIGURE is a schematic sectional view of a hydrocarbon extractor according to the present invention.

DETAILED DESCRIPTION OF THE PREFERRED EMBODIMENT

As shown in the drawing, a hydrocarbon extractor given the general reference 5 is disposed above a tank of a vessel 10 holding a liquid to be freed from oil, for example a mixture of water 12 and of d liquid hydrocarbon 14, particularly a heavy oil, floating on the surface of the water. An endless belt 16 is disposed vertically around two rollers 18 and 20. The belt 16 is made of an oleophilic material, for example a polyester coated with polyurethane, the opposite outer surfaces of which have previously been modified by abrasion. A free pressing roller 22 cooperates with the roller 18, which is rotated by a motor (not shown) in order to drive the belt 16 in a movement in the direction indicated by the arrow 24. During its movement the belt 16 is guided by guide pulleys and by side cheeks (not shown) machined in the rollers 18 and 20.

The passage of the belt 16 through the liquid to be freed from oil brings about the recovery of oil on the outer surfaces of the belt. For the purpose of recovering the oil from the belt 16, the hydrocarbon extractor is, in accordance with the invention, provided with two oleophilic rollers 26 and 28 disposed one on each side of the belt 16 and extending parallel over the entire width of the belt 16. The oleophilic rollers 26 and 28 are rotated in opposite directions, as indicated by the arrows 30, by a motor (not shown) and therefore turn counter to the direction of movement of the belt 16. The peripheral speed of the oleophilic rollers is preferably 20 to 30% higher than that of the belt 16. The oleophilic rollers 26 and 28 are applied against the belt 16, in the direction of the arrows 29 and 31, by springs (not shown) and thus compress the belt 16. Two adjustable scrapers 33 and 35 are each disposed in contact with an oleophilic roller 26, 28 and are adapted to remove the oil from the surface of the rollers. Two spouts 32 and 34, one associated with each oleophilic roller 26, 28, are disposed one on each side of the belt 16. The oil recovered by the oleophilic rollers is discharged into the spouts 32 and 34 and is passed to a storage tank 36.

The present invention makes it possible to have a hydrocarbon extractor which is adapted to be easily installed above any type of liquid tank or vessel. In addition, the use of oleophilic rollers enables the wear on the oleophilic belt to be reduced, since the scrapers act on the rollers and not on the belt.

We claim:

1. Hydrocarbon extractor disposed above a tank containing a liquid mixture including a liquid hydrocarbon, comprising: a belt made of oleophilic material immersed in said mixture; means for driving said belt; and means for recovering the liquid hydrocarbon from the belt, said recovering means including: two oleophilic rollers disposed one on each side of the belt and extending over the entire width of the belt; means for biasing said rollers against the belt; means for rotating said rollers in an opposite direction to that of the movement of the belt at a peripheral speed of the oleophilic rollers that is higher than that of the belt; and a scraper in contact with at least one of said rollers for removing oil therefrom.

2. Extractor according to claim 1, wherein the peripheral speed of the oeophilic rollers is between 20 and 30% higher than that of the belt.

3. Extractor according to claim 1, wherein said scrapers are adjustable relative to their respective rollers to alter the tension force applied to the rollers by said scrapers.

* * * * *